United States Patent
Schmitt et al.

[15] 3,700,754
[45] Oct. 24, 1972

[54] COMPOSITIONS OF POLYMERS OF METHYL METHACRYLATE AND POLYMERS OF ETHYLENE

[72] Inventors: Joseph Michael Schmitt, Ridgefield; Jeffrey Rufus Sherry, Danbury; Albert George Robustelli, Norwalk, all of Conn.

[73] Assignee: American Cyanamid Company, Stamford, Conn.

[22] Filed: Sept. 8, 1970

[21] Appl. No.: 70,572

Related U.S. Application Data

[63] Continuation of Ser. No. 817,155, April 17, 1969, abandoned, which is a continuation-in-part of Ser. No. 618,107, Feb. 23, 1967, abandoned.

[52] U.S. Cl. .............................260/878 R, 260/45.8
[51] Int. Cl. ...........................C08f 1/60, C08f 15/00
[58] Field of Search .................................260/878 R

[56] References Cited

UNITED STATES PATENTS 3,287,444  11/1966  Ennor et al. ...............260/879
3,162,696  12/1964  Zimmerman et al...260/878 R

FOREIGN PATENTS OR APPLICATIONS 697,734  11/1964  Canada.......................260/878
569,684   6/1945  Great Britain.............260/885
946,384   1/1964  Great Britain.........260/878 R

OTHER PUBLICATIONS

Schildknecht, " Polymer Processes," Interscience, New York (1956), pp. 53– 58. TP 156 P6S3.

*Primary Examiner*—James A. Seidleck
*Assistant Examiner*—A. Holler
*Attorney*—Frank M. Van Riet

[57] ABSTRACT

This invention relates to a process for the production of transparent, high impact, molding compositions of matter comprising (1) a polymer of methyl methacrylate with or without comonomers copolymerizable therewith and (2) a copolymer of ethylene having grafted thereon the monomers of (1) and to weatherable modifications thereof.

7 Claims, No Drawings

3,700,754

COMPOSITIONS OF POLYMERS OF METHYL METHACRYLATE AND POLYMERS OF ETHYLENE

CROSS-REFERENCE TO RELATED APPLICATIONS

This application is a continuation of our copending application, Ser. No. 817,155, filed Apr. 17, 1969 now abandoned which in turn is a continuation-in-part of our copending application, Ser. No. 618,107, filed Feb. 23, 1967, now abandoned.

BACKGROUND OF THE INVENTION

The invention described herein relates broadly to the field of high impact molding compositions. The invention resides in molding compositions which contain a resinous polymer and grafted rubbery polymer.

The production of thermoplastic molding compositions having excellent impact strength, chemical resistance, transparency etc. is well known in the art. For instance, molding compositions have been prepared from blends of styrene-acrylonitrile copolymers and cross-linked butadiene-styrene rubber, see U. S. Pat. No. 3,073,798. Additionally, molding compositions have been prepared by blending a hard resin of methyl methacrylate with grafted polybutadiene or butadiene/styrene rubbers, see U. S. Pat. No. 3,261,887. Other compositions have been prepared from polystyrene and a lightly cross-linked copolymer of ethylene and vinyl acetate, see U. S. Pat. No. 3,218,373, while U. S. Pat. No. 3,287,444 discloses the suspension polymerization production of methyl methacrylate-ethylene copolymer interpolymers.

Each of these prior art system fail in at least one property, e.g. impact strength. Some are not transparent and most fail in one other important property, i.e. weatherability. That is to say, the prior art systems, although excellent for many applications, fail in many respects, the most important being impact resistance and weatherability. Even more serious is the fact that these prior art systems cannot be rendered weatherable by the incorporation of additives therewith.

We have now found a new process for the production of impact compositions which, although they are only somewhat more weatherable per se than the other known compositions, unexpectedly may be made substantially completely weatherable by the addition of various additives thereto. Furthermore, the compositions produced by our process are transparent, clear and tough and therefore may also be utilized in all, if not more than, the applications of those of the prior art, as such.

SUMMARY

The compositions produced by the novel process of the instant invention find use as industrial and household molding-extrusion compositions. That is to say, they may be molded by vacuum molding, blow molding etc. into such articles as containers for food, drugs, chemicals etc.; shower doors, automobile accessories, and the like.

DESCRIPTION OF THE INVENTION INCLUDING PREFERRED EMBODIMENTS

The ethylene copolymers used herein are generally well known in the art and their properties and methods for their preparation are more fully discussed in U. S. Pat. No. 3,218,373, mentioned above, which patent is hereby incorporated herein by reference. The ethylene copolymer rubber may be cross-linked or non-cross-linked. If a cross-linked ethylene copolymer rubber is used, it may be cross-linked by contacting the ethylene copolymer rubber with a peroxide catalyst and heating, by radiation or any other known method such as discussed in said U.S. patent previous to our novel interpolymerization procedure. The rubbery copolymers we have found useful comprise (1) from about 50 percent to about 95 percent of ethylene, (2) from about 5 percent to about 50 percent of vinyl acetate, an alkyl acrylate or methacrylate, said alkyl group containing from about 1–18 carbon atoms, inclusive, acrylic acid, methacrylic acid, or mixtures of two or more of said monomers and may also contain (3) up to 20 percent, by weight, based on the total weight of the final ethylene polymer, i.e. that comprising ( 1), (2) and (3) of any of the copolymerizable monomers set forth hereinbelow in regard to the comonomers useful with methyl methacrylate. The rubbery ethylene copolymer may have a melt index, as determined by ASTM–D1238–57T (grams/-10 min.), of from about 0.1 to about 400, preferably 1.0 to 350. The ethylene copolymer rubber should be present in the final compositions of our invention in amounts ranging from about 1.0 percent to about 75 percent, by weight, preferably from about 10 percent to about 50 percent, by weight, based on the total weight of the final compositions.

The methyl methacrylate resinous polymer phase of the compositions produced by our novel process may be comprised of (A) from about 50 percent to about 100 percent of methyl methacrylate and, correspondingly, (B) from about 0 percent to about 50 percent of vinyl acetate or an alkyl acrylate. Mixtures of vinyl acetate and an alkyl acrylate may also be used in the copolymer phase in the above concentrations. The methyl methacrylate copolymer, i.e. that containing vinyl acetate and/or alkyl acrylate, may also contain, in addition thereto, (C) up to 20 percent, by weight, based on the total weight of the polymer, that comprising (A), (B) and (C), of a copolymerizable monomer such as the allyl, methallyl, crotyl, 1-chloroallyl, 2-chlorallyl, vinyl, methvinyl, 1-phenylallyl, butenyl, etc., esters of saturated and unsaturated aliphatic and aromatic monobasic and polybasic acids such, for instance, as acetic, propionic, butyric, valeric, caproic, crotonic, malonic, succinic, glutaric, adipic, pimelic, suberic, azelaic, maleic, fumaric, citraconic, mesaconic, itaconic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative examples of which appear above; acrylic acid, methacrylic acid; vinyl cyclic compounds (including monovinyl aromatic hydrocarbons) e.g., styrene, o-, m-, and P-chlorostyrenes. -bromostyrenes, -fluorostyrenes, -methylstyrenes, - ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl naphthalene, divinyl benzene, trivinyl benzene, allyl benzene, diallyl benzene, the various allyl cyanostyrenes, the various alpha-substituted styrenes and alpha-substituted ring-substituted styrenes, e.g. alpha-methyl styrene, alpha-methyl-paramethyl styrene, etc.; unsaturated ethers, e.g., ethyl vinyl ether, diallyl ether, etc.; unsaturated amides, for instance, acrylamide and N-substituted acrylamides, e.g.; N-methylol acrylamide, N-allyl acrylamide, N-methyl acrylamide, N-phenyl acrylamide, etc.; unsaturated ketones, e.g., methyl vinyl ketone, methyl allyl ketone, etc.; unsaturated polyhydric alcohol (e.g., butenediol, etc.) esters of saturated and unsaturated, aliphatic and aromatic, monobasic and polybasic acids, and the like.

Other examples of monomers that can be interpolymerized with the methyl methacrylate, vinyl acetate and/or alkyl acrylate are the vinyl halides, more particularly vinyl chloride, vinyl bromide and vinyl iodide, and the various vinylidene compounds, including the vinylidene bromide, vinylidene fluoride and vinylidene iodide.

Among other comonomers which may be used in carrying our invention into effect by interpolymerizing them with the methyl methacrylate, vinyl acetate and/or alkyl acrylate are, for example, compounds such as acrylonitrile, and other compounds, e.g., the various substituted acrylonitriles (e.g. methacrylonitrile, ethacrylonitrile, phenylacrylonitrile, etc.) the various N-substituted acrylamides and alkacrylamides, for instance, N-dialkyl acrylamides and methacrylamides, e.g. N-dimethyl, -diethyl, -dipropyl, -dibutyl, etc., acrylamides and methacrylamides, also other acrylates and methacrylates such as methyl acrylate, n-hexyl acrylate, t-butyl methacrylate, stearyl methacrylate and the like.

The resinous, polymeric methyl methacrylate phase of our molding compositions produced according to our process should be present in the final compositions in amounts ranging from about 25 percent to about 90 percent, by weight, preferably 50 percent to about 90 percent, by weight, based on the total weight of the composition.

The ethylene rubber to monomer ratio in the interpolymerization reaction should range from about 0.0101/1 to about 3.0/1.0.

Our novel process comprises dispersing the ethylene copolymer in the monomers being used to form the resin component. No water is used, however, an appropriate solvent such as toluene, benzene, xylene, etc. may be used if desired. The monomers are then polymerized in the presence of a suitable catalyst. The resultant product is then devolatilized to remove the solvent, if present, and unreacted monomer and the molding composition is recovered. In this manner an interpolymer is produced wherein the monomers are grafted onto the rubber and also are copolymerized to form the resin component having unexpected impact strength, clarity and capability of being made weatherable.

The interpolymerization may be conducted at temperatures of from about 10° to 150° C. Any known free-radical generating catalyst which initiates the polymerization of, for example, monomeric methyl methacrylate, may be used. Suitable catalysts include, for example, the organic peroxides such as methyl ethyl ketone peroxide, benzoyl peroxide; the hydroperoxides such as cumene hydroperoxide; the persulfate type compounds such as potassium persulfate, or catalysts such as azobisisobutyronitrile and the like. Additionally, such catalysts as lauroyl peroxide, 2,5-dimethyl-2,5-di(t-butylperoxy)hexane, the dialkyl peroxides, e.g., diethyl peroxide, dipropyl peroxide, dilauryl peroxide, dioleyl peroxide, distearyl peroxide, di-(tertiary-butyl) peroxide and di-(tertiary-amyl) peroxide, such peroxides often being designated as ethyl, propyl, lauryl, oleyl, stearyl, tertiary-butyl and tertiary-amyl peroxides; the alkyl hydrogen peroxides, e.g., tertiary-butyl hydrogen peroxide (tertiary-butyl hydroperoxide), tertiary-amyl hydrogen peroxide (tertiary-amyl hydroperoxide), etc.; symmetrical diacyl peroxides, for instance, peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil acid peroxides; etc., unsymmetrical or mixed diacyl peroxides, e.g. acetyl benzoyl peroxide, propionyl benzoyl peroxide, etc., terpene oxides, e.g. ascaridole, etc.; and salts of inorganic per acids, e.g. ammonium persulfate, sodium persulfate, sodium percarbonate, potassium percarbonate, sodium perborate, potassium perborate, sodium perphosphate, potassium perphosphate, etc. may be used. Other organic peroxide catalysts which may be employed are the following: tetralin hydroperoxide, tertiary-butyl diperphthalate, tertiary-butyl perbenzoate, 2,4-dichlorobenzoyl peroxide, urea peroxide, caprylyl peroxide, p-chlorobenzoyl peroxide, 2,2-bis(tertiary butylperoxy)butane, hydroxyheptyl peroxide, the diperoxide of benzaldehyde and the like. Generally the catalysts may be employed in amounts ranging from about 0.01 percent to 10.0 percent, by weight, based on the weight of the monomer employed.

The devolatilization may be carried out by any known method such as by heating at 110° to 260° C. under vacuum at an absolute pressure of 5 mm to 200, mm mercury, as is known in the art, see for example U. S. Pat. No. 3,090,767.

The transparency of the molding compositions of the instant invention is achieved by matching the refractive indices of the two polymer phases, i.e. the methyl methacrylate polymer phase and the rubbery ethylene copolymer phase. This is readily achieved since the refractive indices of the specific ethylene copolymers employed and those which are formed from the methyl methacrylate and/or the copolymerizable comonomers are easily determined. Transparency can be achieved by matching the known refractive index of the ethylene copolymer with that of the methyl methacrylate polymer within about 0.005 refractive index units.

As mentioned above, we have found that the compositions produced by our novel process may be rendered weatherable. This unexpected result can be achieved by the addition of any known ultraviolet light absorber thereto. That is to say, we have found that incorporation of a U.V. stabilizer such as 2-(2'-hydroxy-5'-methylphenyl)benzotriazole into our compositions increases the weatherability of the composition. By adding these additives, the excellent properties, i.e. impact strength, etc. of the compositions are maintained relatively constant, while with no additives, these properties are dissipated when exposed to ultraviolet light.

Examples of other ultraviolet light absorbers which may be used include the benzylidene esters such as p-methoxybenzylidene dimethyl malonate; the benzophenones such as 2-hydroxy-4-methoxy benzophenone, 2-hydroxy-4-octyloxybenzophenone, -hydroxy-4-methoxy-2'-methylbenzophenone; the 2,2'-dihydroxy-4,4'-dialkoxybenzophenones; 2-hydroxy-5-salicylylbenzophenone; 2-(2-hydroxy-5-t-octylphenyl)benzotriazole; nickel phenolates (U.S. Pat. No. 2,971,940); carbostyrils (U.S. Pat. No. 2,616,855); β-methyl umbellifirone; 4-methyl-7-diethylamino coumarin; the dibenzoyl alkyl phenols such as 2,6-dibenzoyl-4-methylphenol (U.S. Pat. No. 2,890,193) and the like. The ultraviolet light stabilizers should be used in amounts ranging from about 0.05 percent to about 5.0 percent, preferably from about 0.5 percent to about 3.0 percent, by weight, based on the total weight of the composition.

We have also found that the incorporation of any well-known stabilizer into our compositions results in systems which may be easily fabricated under heat and pressure without any material degradation of the properties thereof. In this regard, such stabilizers as the phenols e.g. 2,6-di-t-butyl-4-methyl-phenol, tris-t-octylphenol, tris-α-methylbenzylphenol; α-methyl-cyclohexylated cresols and xylenols; butylated p-phenylphenol; butylated bisphenol A; 2,6-di-t-butyl-4-dimethyl aminomethyl phenol; 4,4'-dihydroxydiphenyl; 2,2'-methylene-bis(4-ethyl-6-t-butylphenol); 4,4'-butylidene-bis(4-ethyl-6-t-butylphenol); thio-bis(2-t-butyl-4-methylphenol); hydroquinone monobenzyl ether; 2-t-butyl hydroquinone monomethylether; tris(nonylphenyl) phosphite, dilaurylthiodipropionate, distearylthiodipropionate, phenyldidecyl phosphite, methylene-bis(dinonyl phenol) and the like may be used.

The stabilizers can be utilized in the same amounts as the ultraviolet light stabilizers mentioned above.

The following examples are set forth by way of illustration only and should not be construed as limiting the instant invention except as set forth in the appended claims. All parts and percentages are by weight unless otherwise specified.

EXAMPLE 1

100 Parts of an ethylene/vinyl acetate copolymer (melt index of 20) (72/28) are blended with 0.05 part of dicumyl peroxide on a rubber mill at 100° C. for 5 minutes and cured in an oven at 150° C. for 1 hour. The resultant product is a lightly cross-linked rubbery copolymer. 100 Parts of the lightly cross-linked copolymer are then dispersed in 900 parts of a 55.5/44.5 toluene/methyl methacrylate mixture in a suitable reaction vessel, and 0.3 percent, based on the weight of methyl methacrylate, of 2,5-dimethyl-2,5-di(t-butylperoxy)n-hexane is added. The temperature is raised to reflux temperature, i.e. about 100°–110° C. and agitation is continued for 18–20 hours. The resultant mass is devolatilized on a rubber mill, granulated and molded. The properties of the resultant transparent composition are set forth below in Table I.

Following the procedure of Example 1, a second blend is prepared with a lower molecular weight (as indicated by the Melt Index) ethylene copolymer. The results of this run are also set forth in Table I.

TABLE I

| Ex. | Notched Izod Impact Strength (fppi) | Melt Index of Ethylene Copolymer |
|---|---|---|
| 1 | 1.03 | 20 |
| 2 | 0.48 | 350 |

Various other compositions were also prepared with varying amounts of vinyl acetate added as a comonomer with the methyl methacrylate. The results are set forth below in Table II. The procedure of Example 1 was again followed.

TABLE II

| Ex. | Ethylene /vinyl acetate concentration | Methyl Methacrylate /vinyl acetate concentration | Notched izod impact strength (fppi) | Tensile at Yield Strength | Modulus | At Yield elongation | At break elongation |
|---|---|---|---|---|---|---|---|
| 3 | 72/28 | 93/7 | 1.2 | 4800 psi | 0.27 × 10⁵ psi | 8.7% | 8.7% |
| 4 | 72/28 | 91/9 | 1.15 | 4400 | 0.25 | 5.3 | 7.3 |
| 5 | 72/28 | 89/11 | 2.43 | 3600 | 0.21 | 6.0 | 6.0 |
| 6 | 72/28 | 88/12 | 1.22 | 3800 | 0.23 | 5.8 | 7.1 |
| 7 | 72/28 | 85/15 | 1.6 | 4200 | 0.25 | 5.8 | 8.8 |
| 8 | 60/40* | 99/1 | 1.1 | — | — — | — |
| 9 | 60/40* | 95/5 | 0.36 | — | — — | — |
| 10 | 60/40* | 90/10 | 0.73 | — | — — | — |
| 11 | 60/40* | 85/15 | 0.58 | — | — — | — |

* = melt index = 50

When 0.1 percent, by weight, of 2-(2'-hydroxy-5'-methyl-henyl)benzotriazole, as an ultraviolet light absorber, and 0.1 percent, by weight, of a butylated and styrenated mixture of m-and p-cresol antioxidant (Federal Register; Vol. 31; No. 18; pg. 1068, Jan. 27, 1966) were added to a composition similar to that of Example 3, the following results were observed.

TABLE III

| | Composition of Ex. 3 Without Additives | Composition of Ex. 3 With Additives |
|---|---|---|
| Izod Impact Strength (fppi) Unnotched | 14.0 | 17.0 |
| | 14.0 | |
| Rockwell Hardness | 100 R | 106 R |
| Light Transmission (1/8" thickness) | 71.2% | 69.5% |
| Color | Colorless | Colorless |

It can therefore be seen that the incorporation of the UV stabilizer and antioxidant improved the hardness and impact strength of the composition.

When the same two specimens were subjectjected to 1000 hours in a Fluorescent Weatherometer, the following results were observed.

TABLE IV

|  | Composition of Ex. 3 Without Additives | | Composition of Ex. 3 With Additives | |
|---|---|---|---|---|
|  | Original | After 1000 hr. | Original | After 1000 hr. |
| Izod Impact Strength (fppi) Unnotched | See Above | 2.0 * | See Above | 17.0 * |
| Yellowness Index (Reflectance) | 9.5 | 13.6 | 9.1 | 11.8 |
| Gloss (Reflectance) | 20°C 60°C<br>19 57 | 20°C 60°C<br>14 51 | 20°C 60°C<br>10 59 | 20°C 60°C<br>9 58 |

TABLE IV (Continued) * Footnote

When the same exposure conditions were used on a commercially available butadiene rubber modified methyl methacrylate copolymer and an ABS copolymer, with no additive the Unnotched Izod Impact Strengths at 0 hour and 100 hour were 19.0 and 7.0 fppi and 40.0 and 4.0 fppi, respectively. Addition of the same additives as above to these commercially available impact compositions did not increase their weatherability.

EXAMPLE 12

A 6 ounce bottle, blow molded from the composition of Example 3, with additives, showed only a 3.2 percent weight loss at 73° F. per year when filled with deionized water.

EXAMPLES 13–16

Following the procedure of Example 1 (except no rubber cross-linking was carried out), an ethylene/vinyl acetate (75/25) rubbery polymer was graft polymerized by interpolymerization with methyl methacrylate and ethyl acrylate to produce a composition containing a concentration of (97/3), respectively of the monomers. The amounts of rubber and resinous copolymer were varied in each example. The results are set forth below in Table V. The amount of 2,5-dimethyl-2,5-di(t-butylperoxy)n-hexane was 0.75 percent and 50 percent toluene and 0.01 percent n-dodecyl mercaptan, both based on the weight of monomer, were added in the preparation.

TABLE V

| Ethylene vinyl acetate 75/25 | Methyl Methacrylate/ acrylate 97/3 | Notched Izod impact strength | Tensile strength | Tensile modulus | Elongation at break | DTL |
|---|---|---|---|---|---|---|
| 20% | 80% | 1.5 fppi | — | — | — | 80°C |
| 25 | 75 | 2.8 | 4.0 × 10³ psi | 0.19 × 10⁶ psi | 11 | 68 |
| 30 | 70 | 3.2 | 3.2 | 0.12 | 17 | 64 |
| 35 | 65 | 4.3 | 2.4 | 0.08 | 43 | 45 |

EXAMPLE 17

The procedure of Example 1 is again followed except that a 75/25 ethylene/vinyl acetate non-cross-linked, rubbery copolymer and a 97/3 methyl methacrylate/ethyl acrylate copolymer charge is used in a 50/50 mixture with toluene and a 20/80 ratio of rubber to resin. 0.75 percent of 2,5-dimethyl-2,5-di(t-butylperoxy)n-hexane and 0.01 percent of n-dodecyl mercaptan, both based on the weight of monomer, were also added. The reaction was allowed to proceed for 20 hours at 103°–110° C. The Izod Impact Strength (fppi) notched of the resultant composition was 0.9.

A series of bars were molded from the composition of Example 17 and various antioxidants and ultraviolet light stabilizers were added to said bars. The bars were subjected to 1,000 hours in a Fluorescent Weatherometer. The following results were observed.

TABLE VI

| UV Stabilizer - conc. | Anti-oxidant - conc. | Unnotched izod impact Strength (fppi) | | |
|---|---|---|---|---|
|  |  | 0 hours | 500 hours | 1000 hours |
| None | None | 10 | 10 | 5 |
| p-methoxybenzylidene dimethyl malonate - 0.2% | None | 15 | 13 | 13 |
| 2-hydroxy-4-methoxy benzophenone - 0.4% | None | 15 | 13 | 13 |
| 2-(2'-hydroxy-5'-methylphenyl)benzo-triazole - 1.0% | None | 15 | 13 | 13 |
| None | 20–24% butylated cresols; 23.5–28.5% styrenated cresols and 42–48% butylated, styrenated cresols - 0.2% | 13 | 11 | 9 |
| None | 2,5-di(t-butyl)-4-methylphenol - 0.4% | 14 | 11 | 10 |
| None | 2,2'-methylenebis-(4-ethyl-6-t-butyl)phenol - 1.0% | 15 | 6 | 5 |
| None | tris(nonyl phenyl) phosphite - 0.5% | 14 | 12 | 11 |
| 2-(2'-hydroxy-5'-methoxyphenyl)benzo-triazole - 1.0% | same cresol mixture as above - 0.2% | 13 | 12 | 11 |
| 2-hydroxy-4-methoxy-benzophenone - 0.4% | 2,5-di(t-butyl)-4-methylphenol - 0.4% | 13 | 12 | 11 |

EXAMPLE 18

The procedure of Example 17 was follow—ed except that the rubber to resin ratio was 35/65, respectively. The composition was compression molded into films having a thickness ranging from 15–35 mils and 2-(2'-hydroxy-5'-methylphenyl) benzotriazole in varying amounts was added. The films were placed in a UV Box for 1,000 hours. The results are set forth below.

TABLE VII

| % Additive | Exposure | Tensile strength at break | Modulus | Elongation at break |
|---|---|---|---|---|
| 0.5% | 0 hr. | 2.4 × 10³ psi | 0.021 × 10⁶ psi | 94% |
| do | 500 hr. | 2.6 | 0.025 | 109 |
| do | 1,000 hr. | 2.5 | 0.024 | 116 |
| 1.0% | 0 hr. | 2.8 | 0.024 | 114 |
| do | 500 hr. | 2.5 | 0.022 | 104 |
| do | 1,000 hr. | 2.5 | 0.020 | 98 |
| no additive- ethylene/vinyl acetate rubber (75/25) alone | 0 | 3.5 | 0.0034 | 1020 |
| do | 500 | 0.39 | 0.022 | 192 |

Compositions having properties generally comparative to those of the compositions of the representative examples above with and without the addition of UV stabilizers and antioxidants were prepared according to Example 1 from the following series of reactants:

EXAMPLE 19

(a) A cross-linked copolymer of ethylene and stearyl methacrylate (95/5), and (b) methyl methacrylate, vinyl acetate and acrylic acid (90/5/5), the amount of (a) being 75 percent and the amount of (b) being 25 percent of the total composition. Rubber to monomer ratio — 3/1.

EXAMPLE 20

(a) A cross-linked copolymer of ethylene and methyl acrylate (50/50), and (b) methyl methacrylate, ethyl acrylate and vinyl acetate (50/40/10), the amount of (a) being 5 percent and the amount of (b) being 95 percent of the total composition. Rubber to monomer ratio — 0.053/1.

EXAMPLE 21

(a) A cross-linked copolymer of ethylene and acrylic acid (90/10) and (b) methyl methacrylate, vinyl acetate and acrylonitrile (85/10/5), the amount of (a) being 25 percent and the amount of (b) being 75 percent of the total composition. Rubber to monomer ratio — 0.33/1.

EXAMPLE 22

(a) A cross-linked copolymer of ethylene and methacrylic acid (85/15) and (b) methyl methacrylate, methyl acrylate and stearyl methacrylate (90/8/2), the amount of (a) being 35 percent and the amount of (b) being 65 percent of the total composition. Rubber to monomer ratio — 0.54/1.

EXAMPLE 23

The procedure of EXAMPLE 1 is again followed except that the rubbery copolymer comprises a copolymer of ethylene and lauryl methacrylate (80/20) and no toluene solvent is used. A polymer composition similar in properties to that of Example 1 is recovered.

EXAMPLE 24

The procedure of Example 1 is again followed with a copolymer of ethylene and butyl acrylate (75/25) substituted for the rubbery copolymer shown therein. A composition having comparable properties is recovered.

EXAMPLE 25

Following the procedure of Example 13 except that an ethylene/stearyl acrylate (75/25) rubbery copolymer is used, results similar to those shown therein are achieved.

EXAMPLE 26

A terpolymer of ethylene/vinyl acetate/acrylic acid (75/20/5) is interpolymerized with methyl methacrylate and ethyl acrylate as described in Example 17. A composition having excellent impact strength is recovered.

EXAMPLE 27

Example 26 is again followed except that the rubbery ethylene polymer comprises ethylene/vinyl acetate/methacrylic acid (75/20/5). Similar results are achieved.

EXAMPLE 28

Example 13 is again followed except that the rubbery ethylene polymer comprises ethylene/vinyl acetate/methyl methacrylate (70/10/20). An excellent impact composition is recovered.

EXAMPLE 29

Example 13 is again followed except that an ethylene/-vinyl acetate/acrylonitrile (80/10/10) rubbery polymer is interpolymerized with methyl methacrylate, ethyl acrylate and acrylic acid (90/5/5). The resultant composition has excellent properties with and without the addition of UV stabilizers and antioxidants.

EXAMPLE 30

Example 1 is again followed except that the rubbery ethylene polymer comprises ethylene/vinyl acetate/vinyl chloride (75/2015). The resultant composition again has properties comparable to those of the product of said Example.

EXAMPLE 31

The procedure of Example 23 is followed except that the ethylene rubbery polymer comprises ethylene/ethyl acrylate/-α-methyl styrene (80/18/2). The properties of the resultant composition are again excellent.

EXAMPLE 32

Example 29 is followed utilizing an ethylene/ethyl acrylate/acrylamide rubbery polymer (80/17/3) instead of that used therein. An impact composition is recovered.

EXAMPLE 33

Example 29 is again followed. An ethylene/ethyl acrylate/vinylidene chloride (70/20/10) rubbery polymer used in place of that disclosed therein. A comparable product is recovered.

EXAMPLE 34

Example 1 is again followed with an 80/15/5 terpolymer of ethylene/ethyl acrylate/methyl crotonate being used in lieu of the ethylene polymer disclosed therein. The resultant impact composition has attractive properties.

EXAMPLE 35

The procedure of Example 1 is again followed except that a 75/25 ethylene/vinyl acetate non-cross-linked, rubbery copolymer and a 97/3 methyl methacrylate/ethyl acrylate copolymer charge is used in a 50/50 mixture with toluene and a 20/80 ratio of rubber to resin. 1.5 percent of 2,5-dimethyl-2,5-di(t-butylperoxy)n-hexane, based on the weight of monomer, is added. The reaction is allowed to proceed for 20 hours at 103°–110° C. The Izod Impact Strength (fppi) notched of the resultant composition is 2.7.

EXAMPLE 36

Following the procedure of Example 35 except that when 0.75 percent of 2,5-dimethyl-2,5-di(t-butylperoxy)n-hexane and 0.01 percent of n-dodecyl mercaptan are used and the toluene is replaced by xylene, the Izod Impact Strength (fppi) notched of the resultant composition is 1.5.

Contrary to expectations, we have also found that cast sheets can be produced from compositions of the ethylene rubber and methyl methacrylate polymer by casting between glass plates an incompletely polymerized methyl methacrylate monomer solution of the ethylene copolymeric rubber in the absence of any solvent. That is to say, an incompletely polymerized solution is produced, as described above for the interpolymerization as a whole. No extraneous solvent is added to the monomer as such and no water is used. Specifically, a catalyst is added to the monomeric methyl methacrylate and ethylene copolymer rubber and the resultant solution is treated under the above-specified conditions in the absence of solvent and water until the viscosity increases to an extent that the solution still flows but is more viscous than the original solution, i.e. some polymerization occurs.

This prepolymerized solution is then poured between glass plates (i.e. into a casting cell) as known in the art. The cell is then subjected to curing as set forth in the examples hereinbelow. It is necessary to completely polymerize the unreacted monomer to about 100 percent conversion, however, over a longer period of time than is generally necessary when the above interpolymerization per se is carried out. This increased reaction time is necessary in order to prevent the formation of bubbles or voids in the resultant casting.

The following examples represent the casting technique.

EXAMPLE 37

Into a suitable reaction vessel is added a mixture of 100 parts of an ethylene/vinyl acetate (75/25) copolymer, 388 parts of methyl methacrylate, 12 parts of ethyl acrylate and 0.8 part of 2,5-dimethyl-2,5-di(t-butylperoxy)n-hexane. The vessel is heated to 100° C. for 3 hours. The resultant prepolymerized media is slightly viscous. The media is poured into a 12 inches × 12 inches × ¼ inch glass casting cell. The cell is placed in an oven and heated at 90° C. for 24 hours, 100° C. for 16 hours and 140° C. for 4 hours. The casting is then removed from the cell. It is a transparent, tough, hard, bubble-free sheet which does not crack, break or materially distort when subjected to violent blows from a 1 pound carpenters hammer.

EXAMPLE 38

The procedure of EXAMPLE 37 is again followed except that 60 parts of an ethylene/vinyl acetate (75/25) copolymer, 477 parts of methyl methacrylate, 53 parts of ethyl acrylate and 2.70 parts of 2,5-dimethyl-2,5-di(t-butylperoxy)n-hexane are used and the curing cycle of the casting procedure is 80° C for 20 hours, 90° C. for 8 hours, 100° C. for 16 hours and 141° C. for 4 hours. The casting is equivalent in properties to that of Example 21 but even more transparent.

Similar castings were produced using the other methyl methacrylate copolymers and ethylene rubbers specified above in Examples 1, 13, 17, 18 and others. Additionally, each casting was made weatherable by the addition, to the prepolymerized media, of the above-specified ultraviolet light absorbers and antioxidants as set forth in the Examples.

EXAMPLE 39

The procedure of Example 1 was again followed except that 10 parts of the same lightly cross-linked ethylene copolymer are dispersed in 990 parts of the same methyl methacrylate solution. The Notched Izod Impact Strength of the resultant composition is 0.40 fppi.

EXAMPLE 40

The procedure of Example 1 is again followed except that a monomer mixture of methyl methacrylate and stearyl methacrylate is substituted for that used therein. A similar produce results.

EXAMPLE 41

A methyl methacrylate-butyl acrylate monomer mixture is substituted for that monomer mixture of Example 40. An excellent product is recovered.

We claim:

1. The process which comprises interpolymerizing (A) from about 25 to about 99 percent, by weight, of (a) at least 50 percent, by weight, of methyl methacrylate, (b) up to 50 percent, by weight, of a comonomer selected from the group consisting of an alkyl acrylate and vinyl acetate and (c) up to 20 percent, by weight, based on the total weight of (a), (b) and (c) of another monomer copolymerizable with said (a), in the presence of (B) from about 1 percent to about 75 percent, by weight, of a non-cross-linked copolymer of (1) from about 50 percent to about 95 percent, by weight of ethylene, (2) a comonomer selected from the group consisting of vinyl acetate, alkyl acrylates and methacrylates, said alkyl groups having from 1–18 carbon atoms, inclusive, acrylic acid, methacrylic acid and mixtures thereof, and (3) up to 20 percent, by weight, based on the total weight of (1), (2) and (3), of another monomer copolymerizable with said (1), in the presence of a free-radical generating catalyst and a solvent for said (A) and said (B), at a temperature ranging from about 10° C. to about 150° C. and in the absence of water.

2. The process of claim 1 wherein (B) is a copolymer of ethylene and vinyl acetate.

3. The process of claim 1 wherein (b) is ethyl acrylate.

4. The process of claim 1 wherein (B) is a copolymer of ethylene and vinyl acetate and (b) is ethyl acrylate.

5. A process which comprises charging to a glass casting cell and casting the partial interpolymerization product of (A) from about 25 percent to about 99 percent, by weight, of (a) at least 50 percent, by weight, of methyl methacrylate, (b) up to 50 percent, by weight, of a comonomer selected from the group consisting of an alkyl acrylate and vinyl acetate and (c) up to 20 percent, by weight, based on the total weight of (a), (b) and (c) of another monomer copolymerizable with said (a), and (B) from about 1 percent to about 75 percent, by weight, of a copolymer of (1) from about 50 percent to about 95 percent, by weight, of ethylene, (2) a comonomer selected from the group consisting of vinyl acetate, alkyl acrylates and methacrylates, said alkyl groups having from 1-18 carbon atoms, inclusive, acrylic acid, methacrylic acid and mixtures thereof, and (3) up to 20 percent, by weight, based on the total weight of (1), (2) and (3), of another monomer copolymerizable with said (1), and in the presence of a free-radical generating catalyst and in the absence of water.

6. A composition of matter comprising (A) from about 25 percent to about 99 percent, by weight, of a polymer of (a) at least 50 percent, by weight, of methyl methacrylate, (b) up to 50 percent, by weight, of a comonomer selected from the group consisting of an alkyl acrylate and vinyl acetate and (c) up to 20 percent, by weight, based on the total weight of (a), (b) and (c) of another monomer copolymerizable with said (a) and (B) from about 1 percent to about 75 percent of a, cross-linked polymer of (1) from about 50 percent to about 95 percent, by weight, of ethylene, (2) a comonomer selected from the group consisting of vinyl acetate, alkyl acrylates and methacrylates, said alkyl groups having from 1-18 carbon atoms, inclusive, acrylic acid, methacrylic acid and mixtures thereof and (3) up to 20 percent, by weight, based on the total weight of (1), (2) and (3) of another monomer copolymerizable with said (1), said (B) having grafted thereon the monomers of said (A).

7. The process which comprises interpolymerizing (A) from about 25 percent to about 99 percent, by weight, of (a) at least 50 percent, by weight, of methyl methacrylate, (b) up to 50 percent, by weight, of a comonomer selected from the group consisting of an alkyl acrylate and vinyl acetate and (c) up to 20 percent, by weight, based on the total weight of (a), (b) and (c) of another monomer copolymerizable with said (a) in the presence of (B) from about 1 percent to about 75 percent, by weight, of a cross-linked copolymer of (1) from about 50 percent to about 95 percent, by weight, of ethylene, (2) a comonomer selected from the group consisting of vinylacetate, alkyl acrylates and methacrylates, said alkyl groups having from 1-18 carbon atoms, inclusive, acrylic acid, methacrylic acid and mixtures thereof, and (3) up to 20 percent, by weight, based on the total weight of (1), (2) and (3), of another monomer copolymerizable with said (1), in the presence of a free-radical generating catalyst and a solvent for said (A) and said (B), at a temperature ranging from about 10° C. to about 150° C. and in the absence of water.

* * * * *